(12) United States Patent
Marcial-Simon et al.

(10) Patent No.: US 10,744,895 B2
(45) Date of Patent: Aug. 18, 2020

(54) METHOD FOR CONTROLLING ELECTRICAL CHARGING OF A GROUP OF VEHICLES

(71) Applicant: Bayerische Motoren Werke Aktiengesellschaft, Munich (DE)

(72) Inventors: Enrique Marcial-Simon, Veitshoechheim (DE); Rainer Mehlhorn, Landsham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/269,621

(22) Filed: Feb. 7, 2019

(65) Prior Publication Data
US 2019/0168633 A1 Jun. 6, 2019

Related U.S. Application Data

(63) Continuation of application No. PCT/EP2017/068193, filed on Jul. 19, 2017.

(30) Foreign Application Priority Data

Aug. 17, 2016 (DE) .................. 10 2016 215 328

(51) Int. Cl.
*H02J 7/00* (2006.01)
*B60L 53/64* (2019.01)
(Continued)

(52) U.S. Cl.
CPC ............ *B60L 53/64* (2019.02); *B60L 53/305* (2019.02); *B60L 53/62* (2019.02); *B60L 53/63* (2019.02);
(Continued)

(58) Field of Classification Search
USPC ....................................................... 320/109
See application file for complete search history.

(56) References Cited

U.S. PATENT DOCUMENTS

2009/0091291 A1   4/2009   Woody et al.
2009/0174365 A1*  7/2009   Lowenthal ........... G06Q 20/401
                                             320/109
(Continued)

FOREIGN PATENT DOCUMENTS

DE   10 2008 050 021 A1   5/2009
DE   10 2011 008 675 A1   7/2012
(Continued)

OTHER PUBLICATIONS

International Search Report (PCT/ISA/210) issued in PCT Application No. PCT/EP2017/068193 dated Nov. 2, 2017 with English translation (four (4) pages).
(Continued)

*Primary Examiner* — Samuel Berhanu
(74) *Attorney, Agent, or Firm* — Crowell & Moring LLP

(57) ABSTRACT

A method controls electrical charging of a group of vehicles, wherein the respective vehicles are connected to a power supply system for charging a vehicle energy store for driving the particular vehicle, wherein a central control system communicates with the respective vehicles in the group and with a server belonging to the power supply system operator. On the basis of a received charging command from the server which specifies a charging period, the central control system selects a number of vehicles from the group which are intended to be charged. A charging time window, a departure time and a desired state of charge of the vehicle energy store at the departure time are each stipulated in advance for one or more specific vehicles of the number of vehicles, wherein the duration of the charging operation until the desired state of charge is reached is estimated for
(Continued)

a particular specific vehicle and the particular specific vehicle distributes the charging operation, according to a cost function which stipulates different cost values for different time periods before the departure time, to the time periods in ascending order of the cost values. The cost function for a particular specific vehicle is stipulated by the central control system on the basis of first to seventh cost values such that charging is preferably carried out in the charging time window and the charging period and at a later time.

12 Claims, 3 Drawing Sheets

(51) Int. Cl.
   *H02J 3/32* (2006.01)
   *B60L 53/63* (2019.01)
   *B60L 53/62* (2019.01)
   *B60L 53/66* (2019.01)
   *B60L 53/30* (2019.01)

(52) U.S. Cl.
   CPC ............... *B60L 53/66* (2019.02); *H02J 3/32* (2013.01); *B60L 2240/80* (2013.01); *B60L 2250/14* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y04S 10/126* (2013.01)

(56) References Cited

U.S. PATENT DOCUMENTS

| | | | |
|---|---|---|---|
| 2010/0017249 A1 | 1/2010 | Fincham et al. | |
| 2010/0292855 A1* | 11/2010 | Kintner-Meyer | H02J 7/007 700/291 |
| 2013/0204443 A1 | 8/2013 | Steven et al. | |
| 2013/0278225 A1* | 10/2013 | Dietze | B60L 53/68 320/137 |
| 2015/0298569 A1 | 10/2015 | Kosetsu | |
| 2016/0016484 A1* | 1/2016 | Igarashi | B60L 50/10 701/22 |
| 2016/0052413 A1* | 2/2016 | Shimizu | H02J 3/00 700/291 |
| 2016/0214489 A1 | 7/2016 | Giusti et al. | |

FOREIGN PATENT DOCUMENTS

| | | |
|---|---|---|
| DE | 10 2012 204 088 A1 | 9/2013 |
| WO | WO 2015/028509 A1 | 3/2015 |

OTHER PUBLICATIONS

German-language Written Opinion (PCT/ISA/237) issued in PCT Application No. PCT/EP2017/068193 dated Nov. 2, 2017 (nine (9) pages).

German-language Search Report issued in counterpart German Application No. 10 2016 215 328.5 dated Jun. 23, 2017 with partial English translation (12 pages).

* cited by examiner

METHOD FOR CONTROLLING ELECTRICAL CHARGING OF A GROUP OF VEHICLES

CROSS REFERENCE TO RELATED APPLICATIONS

This application is a continuation of PCT International Application No. PCT/EP2017/068193, filed Jul. 19, 2017, which claims priority under 35 U.S.C. § 119 from German Patent Application No. 10 2016 215 328.5, filed Aug. 17, 2016, the entire disclosures of which are herein expressly incorporated by reference.

BACKGROUND AND SUMMARY OF THE INVENTION

The invention relates to a method for controlling the electrical charging of a group of vehicles and to a corresponding control system.

The prior art discloses the practice of controlling the charging of the energy stores of a group or pool of electrically drivable vehicles by means of a control system such that requirements of the operator of the electricity grid used for charging in respect of overloads and/or overcapacities are also taken into consideration. In other words, given a corresponding requirement of the electricity grid operator, the charging of particular vehicles of the vehicle pool can be interrupted or delayed in the case of an overload in order to thereby avoid the drawing of power in the electricity grid. In an analogous manner, given a corresponding requirement of the electricity grid operator, the charging of particular vehicles of the pool can be triggered so that the excess power in the case of an overcapacity in the electricity grid is consumed completely or at least substantially by the vehicles.

In the case of the controlled charging of vehicles of a vehicle pool, charging time windows in which the vehicle-based energy store is preferably intended to be charged are often stipulated in the individual vehicles. In this case, although the charging time window is known to the control system controlling the charging of the vehicle pool, the precise time at which the vehicle begins the charging operation in the charging time window is not.

From the prior art, there are approaches that make it possible to charge vehicles of a vehicle pool by means of a cost function. The cost function stipulates the periods of time in which charging should be prioritized by means of different cost values for different periods of time 1 of the charging operation. In other words, the periods of time of a charging operation are stipulated in ascending order of the cost values. The known cost functions in this case do not take into consideration any criteria with respect to a time period with overload or overcapacity in the electricity grid or with respect to the fact that vehicle-based energy stores may be subjected to significant degradation so that at the end of the charging operation they can be charged only with a reduced power.

It is the object of the invention to control the operation of charging a group of vehicles in such a way that overcapacities in an electricity grid can be completely or at least substantially reduced efficiently by way of charging operations of vehicles from the group.

This and other objects are achieved by a method for controlling electrical charging of a group of vehicles in accordance with embodiments of the invention.

The method according to the invention serves to control the electrical charging of a group of vehicles. The respective vehicles are connected to an electricity grid for the purpose of charging a vehicle-based energy store for driving the respective vehicle. The vehicles are therefore electrically drivable vehicles, such as pure electric vehicles or hybrid vehicles, for example. In the method according to the invention, a central control system can communicate with the respective vehicles of the group and with a server of the electricity grid operator. A central control system is to be understood here as meaning a control system or a control device that controls the charging of all of the vehicles of the group. Said control system is realized, in particular, by means of software on a corresponding server. The central control system selects, based on a charging command received there, originating from the server of the electricity grid operator and specifying a (future) charging time period, a number of vehicles from the group (that is to say at least some of the vehicles of the group) that are intended to charge their vehicle-based energy stores by means of the electricity grid in the charging time period. Said selection is effected based on predetermined criteria that stipulate which vehicles are eligible for charging.

A charging time window, a departure time and a desired state of charge of the vehicle-based energy store at the departure time are respectively stipulated in advance for one or more specific vehicles of the number of vehicles and, in particular, for all of the vehicles of this number. The desired state of charge preferably corresponds to a state of charge of 100%. For a respective specific vehicle, the duration of the charging operation until the desired state of charge is reached is estimated. The estimation can be performed by the respective vehicle itself. It is likewise possible for the estimation to be carried out by the control system. In this case, the estimated charging operation (that is to say the estimated duration thereof) can be transmitted to the respective vehicle or the respective vehicle can also carry out the estimation of the charging operation itself. For the specific vehicles, the charging time period is before the departure time or ends at the departure time.

According to the invention, the respective specific vehicle distributes the (estimated) charging operation to the periods of time in ascending order of the cost values in accordance with a cost function that stipulates different cost values for different periods of time until the departure time. The respective specific vehicle is then charged in the periods of time to which the charging process has been distributed based on the cost function. In the context of the invention, a cost value represents a value on a scale for which the relationships "equal to", "greater than" and "less than" are defined. The cost value is preferably a numerical value.

In the method according to the invention, the cost function for a respective specific vehicle is stipulated by the central control system based on the steps a) to g) described below. The designation of the individual steps with letters facilitates referencing thereto. The letters do not imply an order in which the steps are carried out.

In accordance with step a), in the case that the charging time period or a part of the charging time period is within the charging time window, a first cost value is assigned to the charging time period or to the part of the charging time period within the charging time window.

In accordance with step b), in the case that the charging time window or a part of the charging time window temporally succeeds the end of the charging time period, a second cost value, which is higher than the first cost value if a first cost value is assigned, is assigned to the charging time window or to the part of the charging time window after the end of the charging time period.

In accordance with step c), in the case that the charging time window or a part of the charging time window temporally precedes the start of the charging time window, a third cost value, which is higher than all of the assigned cost values from the set consisting of the first and second cost value, is assigned to the charging time window or to the part of the charging time window before the start of the charging time period. Here and in the subsequent text, the term "all of the assigned cost values", always refers only to those cost values of the correspondingly defined set which were actually assigned to the periods of time when carrying out the method.

In accordance with step d), in the case that the charging time period or a part of the charging time period temporally succeeds the charging time window, a fourth cost value, which is higher than all of the assigned cost values from the set consisting of the first to third cost value, is assigned to the charging time period or to the part of the charging time period after the charging time window.

In accordance with step e), in the case that the charging time period or a part of the charging time period temporally precedes the charging time window, a fifth cost value, which is higher than all of the assigned cost values from the set consisting of the first to fourth cost value, is assigned to the charging time period or to the part of the charging time period before the charging time window.

In accordance with step f), a sixth cost value, which is higher than all of the assigned cost values from the set consisting of the first to fifth cost value, is assigned to each period of time that is neither within the charging time period nor within the charging time window and temporally succeeds the end of the charging time period.

In accordance with step g), a seventh cost value, which is higher than all of the assigned cost values from the set consisting of the first to sixth cost value, is assigned to each period of time that is neither within the charging time period nor within the charging time window and temporally precedes the start of the charging time period.

The method according to the invention has the advantage that low cost values are specified for periods of time comprising the charging time window and the charging time period. As a result of this, on the one hand, the requirements of the electricity grid operator after reduction of overcapacities and, on the other hand, the requirements of vehicle users with respect to favorable charging time windows are taken into consideration. Furthermore, using the cost function stipulated in accordance with the invention, charging at late times is also preferred, as a result of which the case that significant degradation of the energy store occurs during charging within the charging time period and as a result the requirements of the electricity grid operator to reduce overcapacities can be met only partially occurs less often. As already mentioned above, the cost values in accordance with the cost function are preferably numerical values. In a particularly preferable implementation of the method according to the invention, said values are integer and, in particular, positive values.

In a further preferred variant of the method according to the invention, the first to seventh cost values are fixedly prescribed independently of which of said cost values are assigned to periods of time. In other words, the values of the first to seventh cost values are already prescribed before the method is carried out and are no longer changed, even if only some of the cost values are allocated to corresponding periods of time. This variant of the method can be realized in a very simple manner.

In a further refinement of the method according to the invention, the assigned first to seventh cost values are stipulated depending on which of the first to seventh cost values are assigned to periods of time. This can be achieved, for example, by virtue of the fact that, although fixed possible values are prescribed for the cost values, these values are always assigned to the next higher cost value depending on the assignment to periods of time, as a result of which different first to seventh cost values result for different assignments.

In a further variant of the method according to the invention, in the case that the departure time is within the charging time window of the respective specific vehicle, the charging time window is shortened so that the departure time coincides with the end of the charging time window. Likewise, in a further variant of the method according to the invention, in the case that the time of the stipulation of the cost function is after the start of the charging time window, the charging time window is shortened in such a way that the start thereof coincides with said time.

In addition to the method described above, the invention relates to a central control system for controlling the electrical charging of a group of vehicles, wherein the respective vehicles are connected to an electricity grid for the purpose of charging a vehicle-based energy store for driving the respective vehicle. The central control system can communicate with the respective vehicles of the group and with a server of the electricity grid operator. The central control system is configured to select, based on a charging command received there, originating from the server of the electricity grid operator and specifying a charging time period, a number of vehicles from the group that are intended to charge their vehicle-based energy stores by means of the electricity grid in the charging time period. In this case, a charging time window, a departure time and a desired state of charge of the vehicle-based energy store at the departure time are respectively stipulated in advance for one or more specific vehicles of the number of vehicles, wherein, for a respective specific vehicle, there is an estimated duration of the charging operation until the desired state of charge is reached.

The respective specific vehicle distributes the charging operation to the periods of time in ascending order of the cost values in accordance with a cost function that stipulates different cost values for different periods of time until the departure time. The control system is configured to carry out a method in which the cost function for a respective specific vehicle is stipulated by the central control system in accordance with steps a) to g) of claim 1.

In a particularly preferred embodiment, the control system according to the invention is configured to carry out one or more preferred variants of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
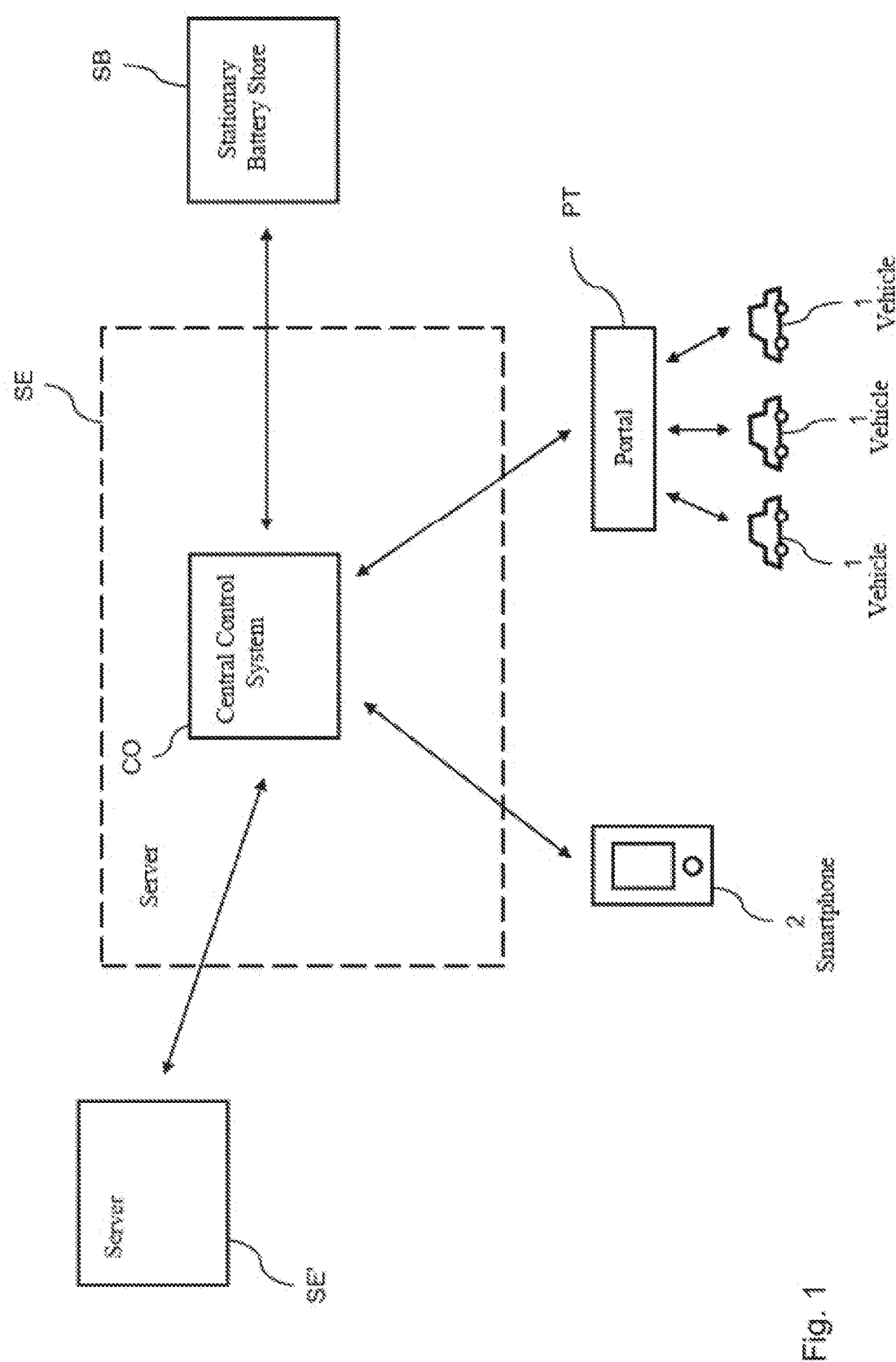
FIG. 1 shows a schematic illustration of an infrastructure in which an embodiment of the method according to the invention is carried out.

FIG. 1 schematically illustrates an infrastructure for carrying out the method according to the invention. A core component of this infrastructure is a central control unit or a central control system CO, which is integrated in a server SE and serves to control the charging of a fleet consisting of a plurality of electrically driven vehicles (that is to say the drive batteries of said vehicles). By way of example, three electric vehicles 1 from said vehicle fleet are portrayed. These vehicles are linked in terms of communication technology to the control unit CO by means of a portal PT. The control system CO has access to the portal PT by means of a suitable control back end (not shown), said portal in turn being able to communicate with the individual vehicles 1, for example by means of SMS. A charging time window can be transmitted from the control system CO to the individual vehicles 1 by means of the communication path via the portal PT, as is described further below.

A user having a smartphone 2 belongs to each individual vehicle 1 of the vehicle fleet, wherein only one single smartphone is indicated for reasons of clarity. Using this smartphone, the user can communicate on the one hand with the control system CO via the control back end (not shown) and on the other hand with their vehicle via the portal PT. In particular, when the drive battery of their vehicle is charging by means of an electricity grid, the user can specify a charging time window in which the charging is particularly favorable. The battery is then preferably charged in the charging time window. Likewise, said user can stipulate a departure time and the desired state of charge at the departure time (generally 100%). These data are transmitted via the smartphone 2 both to the central control system CO and to the vehicle 1 of the user.

In accordance with FIG. 1, the control system CO also communicates with a server SE', which belongs to an electricity grid operator at whose electricity grid the vehicles 1 of the vehicle fleet or the batteries thereof are charged. Furthermore, an optional energy storage system in the form of a stationary battery store SB is provided in the infrastructure of FIG. 1, which battery store can be actuated by way of the control system CO by means of a suitable interface and belongs to the operator of the control system CO. The operator of the control system is, for example, the producer of the vehicles 1 of the vehicle fleet.

An aim of the infrastructure of FIG. 1 consists in that the electricity grid operator can send commands to the control system CO via their server SE' in the case of overload or overcapacity in their electricity grid. Consequently, in the case of overload, the control system can suspend the charging of at least some of the currently charging vehicles 1 for a prescribed suspension interval in a suitable manner in order to thereby reduce the load in the electricity grid. In an analogous manner, in the case of overcapacity, the control system can allow corresponding vehicles in the pool to carry out charging of their drive batteries when overcapacity occurs. In the context of the embodiment described here, only the case of overcapacity in the electricity grid is relevant here, with the result that the case of overload is not described further.

In the case of a future overcapacity (that is to say too much produced electrical energy) in the electricity grid, a corresponding command, which contains, inter alia, the time of the occurrence of the overcapacity, is transmitted from the server SE to the control system CO. In this case, a fixed time period for which corresponding vehicles are intended to draw charging current when the overcapacity occurs is also stipulated. There is therefore a fixedly prescribed future charging time period, which is denoted in FIG. 2 described further below by OC (overcapacity).

After a command relating to an overcapacity has been received, the control unit CO selects predetermined vehicles from the pool for which departure times after the charging time period OC have been stipulated. The selected vehicles have also estimated the duration of a charging operation based on the present state of charge of the vehicle-based energy store and on the desired state of charge to be reached at the departure time. The number of selected vehicles has been stipulated by the control system in such a way that all of the overcapacity of the electricity grid can be absorbed by charging the corresponding vehicle-based energy stores.

The respective selected vehicles are charged based on a cost function, which stipulates different cost values, which are integer values in the embodiment described here, for different periods of time between the present time (that is to say the time of stipulation of the cost function) and the departure time. A respective vehicle distributes its estimated charging operation in ascending order of the cost values to the corresponding periods of time by means of the cost function. Then, in the respective vehicles, the energy stores thereof are charged in the periods of time distributed by means of the cost function. The aim of the invention is to stipulate the cost function in such a way that, on the one hand, charging takes place preferably in the time period OC with overcapacity and in the charging time window and, on the other hand, charging takes place as late as possible. Late charging takes into consideration the fact that the charging in the time period OC is then intended to be carried out as far as possible when no significant degradation of the energy store of the relevant vehicle has yet occurred. Significant degradation leads to charging using full charging power no longer being possible and therefore the requirements of the electricity grid operator no longer being able to be met with respect to reducing an overcapacity.

In order to take into consideration the above circumstances, in the embodiment described here, the cost function is stipulated according to certain method steps. This is described in more detail with reference to the following FIG. 2. FIG. 2 relates to the stipulation of a cost function for an individual selected vehicle, wherein the cost function in other selected vehicles is stipulated by the control system CO in the same way.

Figure 2A:
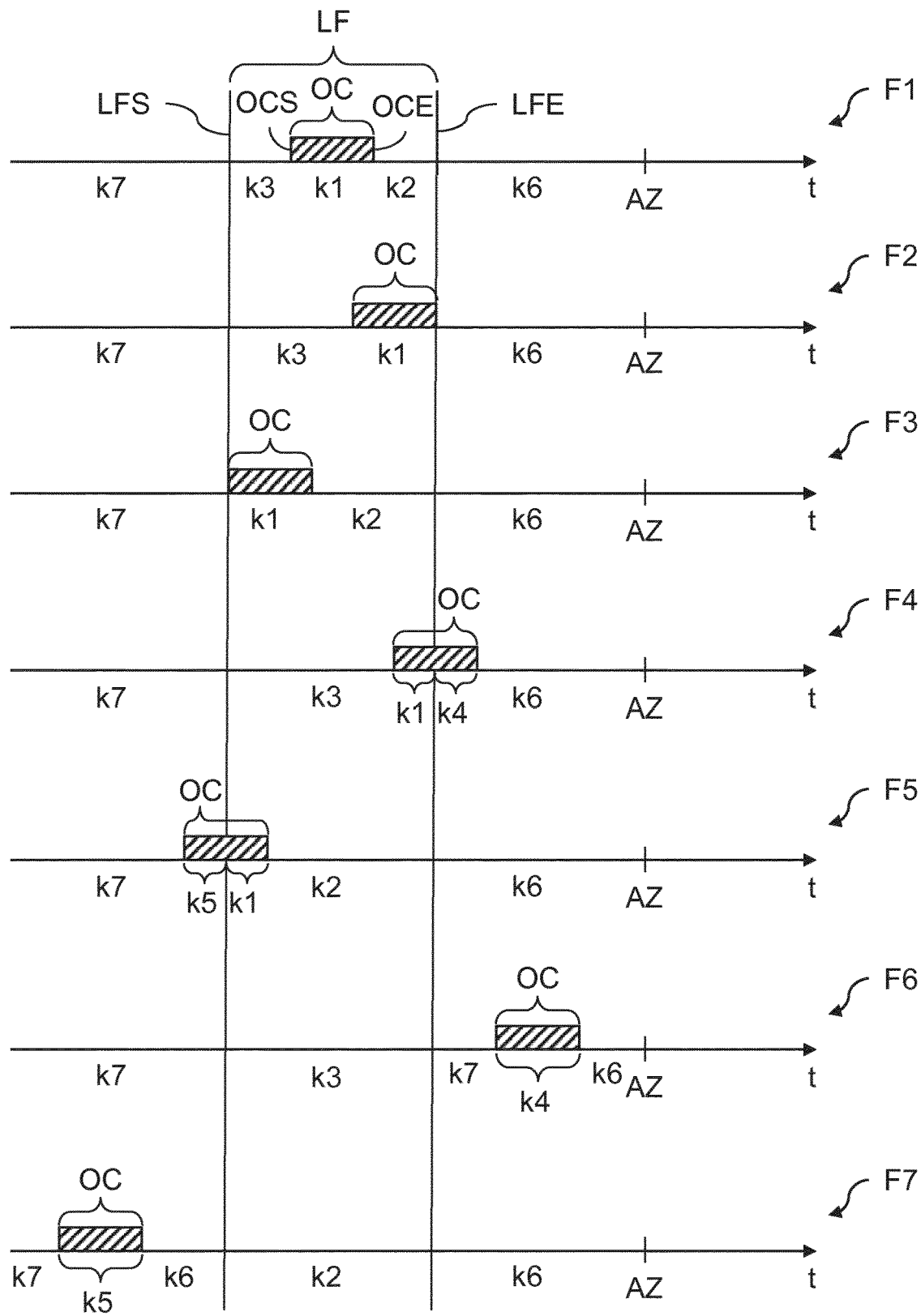
FIGS. 2A and 2B show a diagram illustrating the assignment of periods of time to cost values in accordance with an embodiment of the method according to the invention.
Figure 2B:
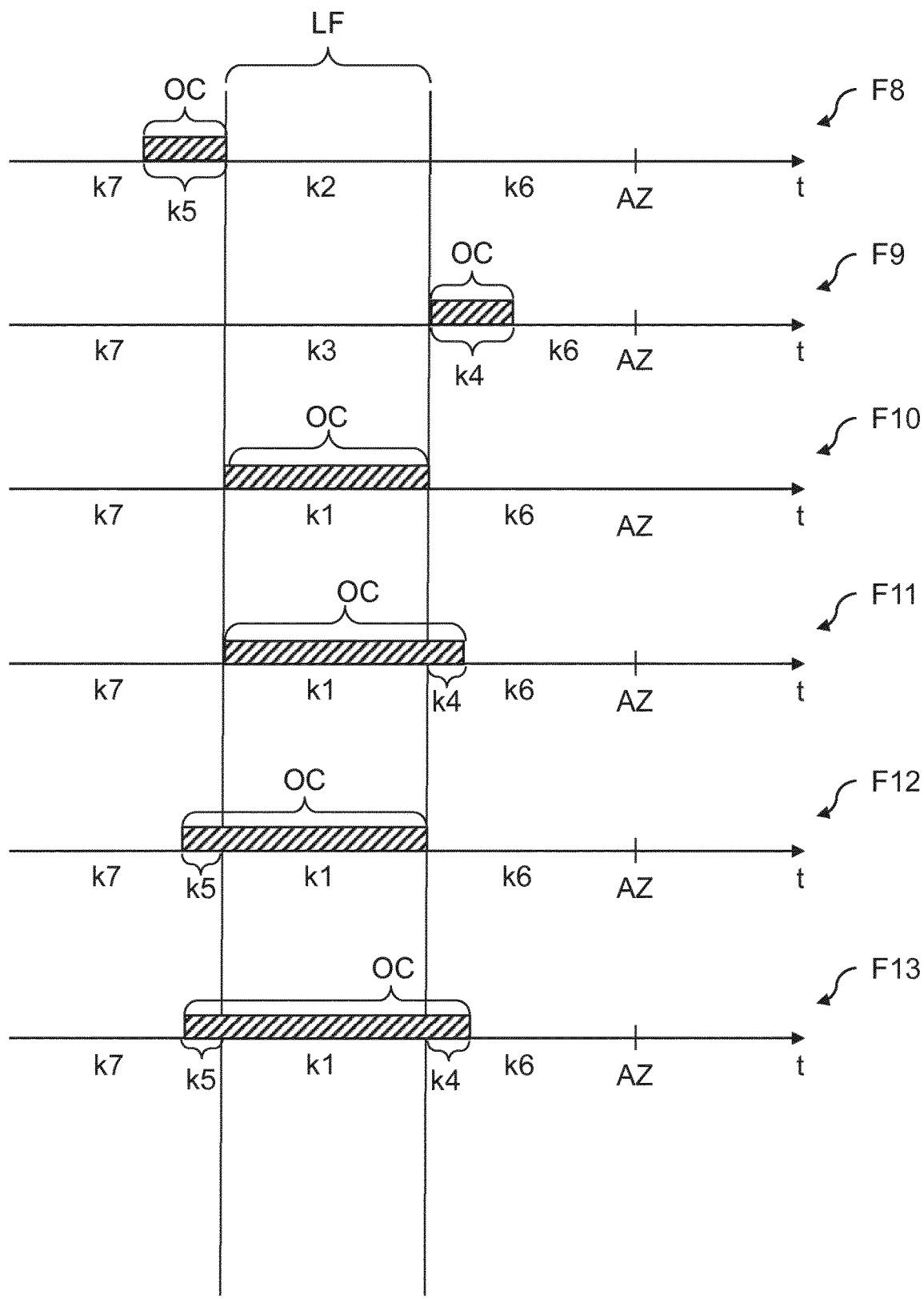

In the scenario of FIG. 2A and FIG. 2B, it is assumed that the cost function comprises the first cost value $k_1$, the second cost value $k_2$, the third cost value $k_3$, the fourth cost value $k_4$, the fifth cost value $k_5$, the sixth cost value $k_6$ and the seventh cost value $k_7$. These values can be stipulated, for example, as follows:

$k_1=0$, $k_2=1$, $k_3=2$, $k_4=3$, $k_5=4$, $k_6=5$, $k_7=6$.

The cost values can also be defined differently if the cost values increase from the first to the seventh cost value.

In accordance with FIG. 2A and FIG. 2B, thirteen cases F1 to F13 are shown, which each portray the time axis t and represent different scenarios of the relative position of the charging time period OC with respect to the charging time window LF of the observed vehicle. In the individual cases F1 to F13, the charging time period OC with the overcapacity is portrayed by a hatched bar, the start of which is denoted by OCS and the end of which is denoted by OCE. For reasons of clarity, the reference signs OCS and OCE have only been portrayed for case F1 in FIG. 2A. Moreover, a charging time window LF having a corresponding start LFS and end LFE is illustrated. Furthermore, the departure time AZ of the relevant vehicle is portrayed. Corresponding reference signs k1 to k7 below the time axis t indicate the cost values for different periods of time. A cost value relates to the period of time located above it, which always ends at the next time limit (depending on the case given by limits of the charging time window and/or the charging time period and/or by the departure time).

In accordance with case F1, the charging time period OC is fully within the charging time window LF. Consequently, the lowest cost value k1 is assigned to the total time period OC. Since late charging within the charging time window is preferred, the lower cost value k2 is allocated to the section of the charging time window on the right of the charging time period OC and the higher cost value k3 is allocated to the region of the charging time window LF on the left of the charging time period OC. For regions outside of the charging time window LF, charging is again preferred at a late time. Therefore, the lower cost value k6 is allocated to the region after the end LFE of the charging time window up to the departure time AZ and the higher cost value k7 is allocated to the region before the start LFS of the charging time window. In case F1, the conditions specified in certain method steps, according to which the charging time period OC is partly before or after the charging time window LF, do not occur. Consequently, the fourth and fifth cost value k4 and k5 are not allotted.

In accordance with case F2 in FIG. 2A, the time period OC is directly at the end LFE of the charging time window LF. This results in there not being a region of the charging time window LF on the right next to the end OCE of the charging time period OC. That is to say the condition in accordance with a method step does not occur, with the result that a second cost value k2 is not allotted.

In case F3, the charging time period OC is directly at the start LFS of the charging time window LF. In contrast to case F2, although a second cost value k2 is now allotted again, the condition in accordance with a method step does not occur, with the result that a third cost value k3 is not allotted.

In case F4 in FIG. 2A, the charging time period OC is partly after the charging time window LF. This results in a region of the charging time period on the right next to the end LFE of the charging time window LF. Consequently, a fourth cost value k4 is allotted according to a method step. Said cost value k4 did not occur in the preceding cases F1 to F3.

In case F5, the charging time period OC is partly before the charging time window LF. Consequently, a fifth cost value k5 is assigned to the charging time period before the charging time window in accordance with a method step. Furthermore, in case F5, the cost value k2 has been allocated to the part of the charging time window that is not covered by the charging time period OC, whereas in case F4 the cost value k3 has been allocated to said region. This is because the region of the charging time window without an overlap with the charging time period OC temporally succeeds the charging time period in case F5 and temporally precedes the charging time period OC in case F4. Consequently, the condition in accordance with a method step is met in case F5 and the condition in accordance with another method step is met in case F4.

In case F6, the charging time period OC is completely after the end LFE of the charging time window. Consequently, there are two periods of time that meet a method step and to which the cost value k7 is therefore assigned. Said periods of time comprise the period of time between the end LFE of the charging time window LF and the start OCS of the charging time period OC and the period of time on the left next to the start LFS of the charging time window LF.

In case F7, the charging time period OC is completely before the start LFS of the charging time window LF. Consequently, there are two periods of time that meet the condition in accordance with a method step and to which the cost value k6 is therefore assigned. Said periods of time comprise the period of time from the end OCE of the charging time period OC up to the start LFS of the charging time window LF and the period of time from the end LFE of the charging time window LF up to the departure time AZ.

In accordance with case F8 in FIG. 2B, the end OCE of the charging time period OC directly adjoins the start LFS of the charging time window LF. In contrast to case F7, there is therefore just one period of time with the sixth cost value k6. In case F9, the start OCS of the charging time period OC directly adjoins the end LFE of the charging time window LF. In contrast to case F6, there is therefore just one period of time with the seventh cost value k7. In case F10, the charging time period OC is covered by the charging time window LF. In contrast to case F1, there are therefore no periods of time with the second cost value k2 and the third cost value k3.

In case F11, the charging time period OC extends over the end LFE of the charging time window LF. In contrast to case F10, there is now one period of time with the fourth cost value k4. In case F12, the charging time period OC extends over the start LFS of the charging time window LF, whereas the end OCE of the charging time period OC coincides with the end LFE of the charging time window LF. In contrast to case F11, there is now no period of time with the fourth cost value k4, but a period of time with the fifth cost value k5 occurs. In case F13, a part of the charging time period OC is both on the left next to the start LFS of the charging time window LF and on the right next to the end LFE of the charging time window LF. There is therefore both a period of time with the fourth cost value k4 and a period of time with the fifth cost value k5.

After the cost values have been stipulated for the respective vehicles according to the method explained with reference to FIG. 2A and FIG. 2B, said cost values with the allocated periods of time are transmitted to the respective selected vehicles, which then distribute the estimated charging operation in accordance with the cost values so that charging takes place in the correspondingly specified periods of time.

The stationary battery store SB shown in FIG. 1 is used in the embodiment described here whenever the overcapacity specified by the command of the server SE' cannot be covered by charging the batteries of the vehicles of the vehicle pool. In this case, a corresponding power draw of the battery store leads to all or as much as possible of the overcapacity of the electricity grid operator being able to be absorbed.

In the embodiment just described, the cost values k1 to k7 have been fixedly prescribed at the beginning of the method and are not dependent on which of the cost values are actually assigned to periods of time. In an alternative embodiment, it is also possible that the cost values are stipulated depending on which cost values are actually used in the distribution of the charging operation. For the individual cases F1 to F13, a next higher numerical value can thus be prescribed for the next higher present cost value in ascending order of the index of cost values used, which results in the cost values being different for the different cases. In FIG. 2A, this would lead, for example, to the cost value k3 of case F2 corresponding to the cost value k2 of case F1, the cost value k6 of case F2 corresponding to the cost value k3 of case F1 and the cost value k7 of case F2 corresponding to the cost value k6 of case F1. In contrast, the cost values k1 for the two cases F1 and F2 are identical. In this variant, the comparison of costs of different vehicles generally leads to different results, which can be used for the control of pool optimization.

The embodiments of the invention described in the preceding text have a series of advantages. In particular, charging of vehicle-based energy stores in a vehicle pool in accordance with a suitable cost function can be achieved in such a way that, on the one hand, charging preferably takes place in a (favorable) charging time window and in the time period of an arising overcapacity and, on the other hand, the charging takes place as late as possible. The last criterion leads to a decrease in the likelihood of significant degradation of the corresponding vehicle-based energy store during the charging time period.

LIST OF REFERENCE SIGNS

1 Vehicle
2 Smartphone
CO Central control system
SE, SE' Server
SB Stationary battery store
PT Portal
LF Charging time window
LFS Start of the charging time window
LFE End of the charging time window
OC Charging time period
OCS Start of the charging time period
OCE End of the charging time period
AZ Departure time
k1, k2, . . . , k7 Cost values
F1, F2, . . . , F13 Cases
t Time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling electrical charging of a group of vehicles, wherein respective vehicles are connected to an electricity grid for charging a vehicle-based energy store for driving the respective vehicle, wherein a central control system communicatable with the respective vehicles of the group and with a server of the electricity grid operator, wherein the central control system selects, based on a received charging command originating from the server of the electricity grid operator and specifying a charging time period, a number of vehicles from the group that are intended to charge their vehicle-based energy stores by way of the electricity grid, wherein a charging time window, a departure time and a desired state of charge of the vehicle-based energy store at the departure time are respectively stipulated in advance for one or more specific vehicles of the number of vehicles, wherein, for a respective specific vehicle, the duration of the charging operation until the desired state of charge is reached is estimated and the respective specific vehicle distributes the charging operation to the periods of time in ascending order of the cost values (k1, . . . , k7) in accordance with a cost function that stipulates different cost values (k1, . . . , k7) for different periods of time until the departure time, wherein the cost function for a respective specific vehicle is stipulated by the central control system as follows:

a) if the charging time period or a part of the charging time period is within the charging time window, a first cost value (k1) is assigned to the charging time period or to the part of the charging time period within the charging time window;

b) if the charging time window or a part of the charging time window temporally succeeds the end of the charging time period, a second cost value (k2), which is higher than the first cost value (k1) if a first cost value (k1) is assigned, is assigned to the charging time window or to the part of the charging time window after the end of the charging time period;

c) if the charging time window or a part of the charging time window temporally precedes the start of the charging time period, a third cost value (k3), which is higher than all of the assigned cost values from the set consisting of the first and second cost value (k1, k2), is assigned to the charging time window or to the part of the charging time window before the start of the charging time period;

d) if the charging time period or a part of the charging time period temporally succeeds the charging time window, a fourth cost value (k4), which is higher than all of the assigned cost values from the set consisting of the first to third cost value (k1, k2, k3), is assigned to the charging time period or to the part of the charging time period after the charging time window;

e) if the charging time period or a part of the charging time period temporally precedes the charging time window, a fifth cost value (k5), which is higher than all of the assigned cost values from the set consisting of the first to fourth cost value (k1, . . . , k4), is assigned to the charging time period or to the part of the charging time period before the charging time window;

f) a sixth cost value (k6), which is higher than all of the assigned cost values from the set consisting of the first to fifth cost value (k1, . . . , k5), is assigned to each period of time that is neither within the charging time period nor within the charging time window and temporally succeeds the end of the charging time period;

g) a seventh cost value (k7), which is higher than all of the assigned cost values from the set consisting of the first to sixth cost value (k1, . . . , k6), is assigned to each period of time that is neither within the charging time period nor within the charging time window and temporally precedes the start of the charging time period.

2. The method as claimed in claim 1, wherein
the cost values (k1, . . . , k7) are integer values.

3. The method as claimed in claim 2, wherein
all of the first to seventh cost values (k1, . . . , k7) are fixedly prescribed independently of which of said cost values are assigned to periods of time.

4. The method as claimed in claim 1, wherein
the assigned first to seventh cost values (k1, . . . , k7) are stipulated depending on which of the first to seventh cost values are assigned to periods of time.

5. The method as claimed in claim 1, wherein
in case the departure time is within the charging time window of the respective specific vehicle, the charging time window is shortened so that the departure time coincides with the end of the charging time window.

6. The method as claimed in claim 1, wherein
in case the time of the stipulation of the cost function is after the start of the charging time window, the charging time window is shortened in such a way that the start thereof coincides with said time.

7. A central control system for controlling electrical charging of a group of vehicles, wherein the respective vehicles are connected to an electricity grid for charging a vehicle-based energy store for driving the respective vehicle, wherein the central control system is communicatable with the respective vehicles of the group and with a server of the electricity grid operator, wherein the central control system is configured to select, based on a received charging command originating from the server of the electricity grid operator and specifying a charging time period, a number of vehicles from the group that are intended to charge their vehicle-based energy stores by way of the electricity grid, wherein a charging time window, a departure time and a desired state of charge of the vehicle-based energy store at the departure time are respectively stipulated in advance for one or more specific vehicles of the number of vehicles, wherein, for a respective specific vehicle, there is an estimated duration of the charging operation and the respective specific vehicle distributes the charging operation to the periods of time in ascending order of the cost values in accordance with a cost function that stipulates different cost values for different periods of time until the departure time, wherein the control system is configured to carry out a method in which the cost function for a respective specific vehicle is stipulated by the central control system as follows:

a) if the charging time period or a part of the charging time period is within the charging time window, a first cost value is assigned to the charging time period or to the part of the charging time period within the charging time window;

b) if the charging time window or a part of the charging time window temporally succeeds the end of the charging time period, a second cost value, which is higher than the first cost value if a first cost value is assigned, is assigned to the charging time window or to the part of the charging time window after the end of the charging time period;

c) if the charging time window or a part of the charging time window temporally precedes the start of the charging time period, a third cost value, which is higher than all of the assigned cost values from the set consisting of the first and second cost value, is assigned to the charging time window or to the part of the charging time window before the start of the charging time period;

d) if the charging time period or a part of the charging time period temporally succeeds the charging time window, a fourth cost value, which is higher than all of the assigned cost values from the set consisting of the first to third cost value, is assigned to the charging time period or to the part of the charging time period temporally after the charging time window;

e) if the charging time period or a part of the charging time period temporally precedes the charging time window, a fifth cost value, which is higher than all of the assigned cost values from the set consisting of the first to fourth cost value, is assigned to the charging time period or to the part of the charging time period before the charging time window;

f) a sixth cost value, which is higher than all of the assigned cost values from the set consisting of the first to fifth cost value, is assigned to each period of time that is neither within the charging time period nor within the charging time window and temporally succeeds the end of the charging time period;

g) a seventh cost value, which is higher than all of the assigned cost values from the set consisting of the first to sixth cost value, is assigned to each period of time that is neither within the charging time period nor within the charging time window and temporally precedes the start of the charging time period.

8. The control system as claimed in claim 7, wherein the cost values ($k1, \ldots, k7$) are integer values.

9. The control system as claimed in claim 7, wherein all of the first to seventh cost values ($k1, \ldots, k7$) are fixedly prescribed independently of which of said cost values are assigned to periods of time.

10. The control system as claimed in claim 7, wherein the assigned first to seventh cost values ($k1, \ldots, k7$) are stipulated depending on which of the first to seventh cost values are assigned to periods of time.

11. The control system as claimed in claim 7, wherein in case the departure time is within the charging time window of the respective specific vehicle, the charging time window is shortened so that the departure time coincides with the end of the charging time window.

12. The control system as claimed in claim 7, wherein in case the time of the stipulation of the cost function is after the start of the charging time window, the charging time window is shortened in such a way that the start thereof coincides with said time.

* * * * *